(12) United States Patent
Moon

(10) Patent No.: US 6,930,748 B2
(45) Date of Patent: Aug. 16, 2005

(54) LIQUID CRYSTAL DISPLAY DEVICE AND METHOD FOR MANUFACTURING THE SAME

(75) Inventor: Hong Man Moon, Kyongsangouk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/025,765

(22) Filed: Dec. 26, 2001

(65) Prior Publication Data

US 2002/0085162 A1 Jul. 4, 2002

(30) Foreign Application Priority Data

Dec. 29, 2000 (KR) ........................................ 2000-85558

(51) Int. Cl.$^7$ .......................... G02F 1/1333; G02F 1/13; G02B 27/00; G02B 33/00
(52) U.S. Cl. .......................... 349/158; 349/84; 349/195; 359/609; 216/23
(58) Field of Search .......................... 349/84, 158, 195, 349/13, 16, 199, 200, 138; 216/23; 359/609

(56) References Cited

U.S. PATENT DOCUMENTS

| 4,505,547 | A | * | 3/1985 | Sekimura ..................... 349/137 |
| 5,246,782 | A | * | 9/1993 | Kennedy et al. ............. 428/421 |
| 5,733,177 | A | * | 3/1998 | Tsuchiya et al. .............. 451/41 |
| 5,766,493 | A | | 6/1998 | Shin ............................. 216/23 |
| 5,835,176 | A | | 11/1998 | Jeong et al. ................. 349/124 |
| 6,150,430 | A | * | 11/2000 | Walters et al. ................ 522/79 |
| 6,197,209 | B1 | | 3/2001 | Shin et al. ..................... 216/84 |
| 6,327,011 | B2 | * | 12/2001 | Kim ............................ 349/122 |
| 6,380,479 | B2 | * | 4/2002 | Nakai et al. ................. 136/246 |
| 6,509,076 | B1 | * | 1/2003 | Otaki et al. ................ 428/40.1 |
| 2002/0079289 | A1 | * | 6/2002 | Doh, II ........................ 216/31 |

FOREIGN PATENT DOCUMENTS

| JP | 401313520 | * | 12/1989 |
| JP | 02138459 | | 5/1990 |
| JP | 3022390 | | 1/1991 |
| JP | 403228025 | * | 10/1991 |
| JP | 4116619 | | 4/1992 |
| JP | 5249422 | | 9/1993 |
| JP | 5249423 | | 9/1993 |
| JP | 7168172 | | 7/1995 |
| JP | 407199165 | * | 8/1995 |

* cited by examiner

*Primary Examiner*—Tarifur R. Chowdhury
*Assistant Examiner*—Hoan C Nguyen
(74) *Attorney, Agent, or Firm*—McKenna Long & Aldridge LLP

(57) ABSTRACT

A liquid crystal display device is disclosed, which can remove a defect generated from polishing and etching of a glass substrate. The LCD device includes first and second substrates assembled together with some spaces therebetween, each having an etched outer surface, and a passivation film outside the first and second substrates. In the LCD device, the passivation film such as BCB or photo-acrylate is formed on a surface of a glass substrate damaged by etching and polishing processes, so as to repair the damaged surface of the glass substrate.

21 Claims, 3 Drawing Sheets

LIQUID CRYSTAL DISPLAY DEVICE AND METHOD FOR MANUFACTURING THE SAME

This application claims the benefit of Korean Patent Application No. P2000-85558, filed on Dec. 29, 2000, the entirety of which is hereby incorporated by reference for all purposes as if fully set forth herein.

BACKGROUND OF THE INVENTION

1. Field of the Invention

The present invention relates to a liquid crystal display (LCD) device, and more particularly, to an LCD device and a method for manufacturing the same that can remove a defect generated from polishing and etching of a glass substrate.

2. Background of the Related Art

Recently, research of flat panel displays such as liquid crystal displays (LCD), plasma display panels (PDP), electroluminescent displays (ELD), vacuum fluorescent displays (VFD), etc., is being performed, and these displays are being used in various apparatuses.

Among these displays, LCDs are most widely used in that they have good picture quality and low power consumption characteristics. They are being used as the display in portable televisions and notebook computers.

Portable televisions or notebook computers are obtaining their popularity because they are lightweight. A main component of technology development is to further decrease their weight. To this end, there are specific efforts to decrease the weight of the LCD itself.

Various ways for decreasing the weight of the LCD have been attempted. However, LCD structure and current technology limit the decrease of weight and size to the main elements of the LCD.

In the meantime, a glass substrate, which is one of the most basic elements of the LCD, still has a margin available for decreasing the weight of the LCD according to developments in processing technologies. Since the glass substrate occupies most of the total weight of the LCD, research for decreasing the weight of the class substrate is being performed for the purpose of decreasing the weight of the LCD.

In order to decrease the weight of the glass substrate, its thickness should be decreased incrementally. However, if the thickness decreases below a specific value, the glass substrate is broken during its processing or cracks are generated. Therefore, there is a limitation in decreasing the thickness of the glass substrate.

As a way for decreasing the thickness of the glass substrate, after an LCD panel is fabricated using a glass substrate having the specific thickness or more, a surface of the glass substrate is etched by dipping the glass substrate in an etching bath in which an etchant is contained.

This method, however, has disadvantages in that the glass substrate is disproportionally etched due to the incompleteness of the glass substrate itself, or foreign particles generated during the etching process stick to the etched surface of the glass substrate and thus the surface of the glass substrate becomes irregular.

A general LCD device and a method for manufacturing the same will be described with reference to following drawings.

FIG. 1 is a sectional view of the general LCD device.

As shown in FIG. 1, in the general LCD device, first glass substrate 3 and second glass substrate 4 are assembled together by a sealing pattern 6 to form some space therebetween. The general LCD device includes an LCD panel consisting of a liquid crystal 5 injected into the space between the first glass substrate 3 and second glass substrate 4 and charged by an electric field; polarizers 2-1 and 2-2 formed in upper and lower portions of the LCD panel; and a backlight 1 providing light from the back of the polarizer 2-1.

A method for manufacturing the LCD panel of the aforementioned LCD device will be described briefly.

A plurality of the LCD panels according to desired sizes are formed on a pair of large sized glass substrates having spaces corresponding to a plurality of the LCD devices. The pair of large sized glass substrates are assembled together to form some space therebetween, and then are cut according to the respective LCD panels. Subsequently, the liquid crystal is injected into the spaces between the glass substrates of the cut LCD panel.

Gate lines and data lines are formed on one of the glass substrates in each LCD panel to define pixel regions in a matrix arrangement. Also, the gate lines are formed to cross the data lines. A thin film transistor and a pixel electrode are arranged in each of the respective pixel regions. Then, a color filter layer and a common electrode are arranged on the other glass substrate in each LCD panel. Such glass substrates are aligned with each other, and are assembled with each other by a sealant to form space between the glass substrates. As aforementioned, the glass substrates are cut according to the respective LCD panels, and the liquid crystal is injected therebetween.

In this process, the assembled glass substrates are etched by etching equipment to reduce the weight of the LCD device before cutting the pair of glass substrates according to the respective LCD panels.

Prior to etching, a signal line, a thin film transistor, a pixel electrode, a color filter, and a common electrode (not shown) are formed on the first and second glass substrates having a thickness (t) of about 1.1 mm, and then the first and second glass substrates are assembled with each other as shown in FIG. 2A.

As shown in FIG. 2B, after the first and second glass substrates are assembled together, outer surfaces of the first and second glass substrates having a thickness (t') of about 0.5 mm, for example, are etched by chemical etching or mechanical polishing processes.

However, in the etching process, grooves 11 or scratches occur in the glass substrates. For this reason, the outer surfaces of the glass substrates assembled with each other become irregular. This results in the occurrence of dot or spot defects on a screen during driving the LCD device.

SUMMARY OF THE INVENTION

Accordingly, the present invention is directed to a liquid crystal display (LCD) device that substantially obviates one or more problems due to limitations and disadvantages of the related art.

An advantage of the present invention is to provide an LCD device and a method for manufacturing the same, in which a glass organic film such as benzocyclobutene (BCB) and photo-acrylate is deposited on a surface of a glass substrate damaged by etching and polishing processes, so as to repair the damaged surface of the glass substrate.

Additional advantages, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an LCD device according to the present invention includes first and second substrates assembled together with some spaces therebetween, each having an etched outer surface; and a passivation film on an outer surface of the first and second substrates.

In another aspect of the present invention, a method for manufacturing an LCD device includes the steps of preparing first and second substrates; assembling the first and second substrates together, etching surfaces of the assembled first and second substrates, and forming a passivation film on the surfaces of the first and second substrates.

Herein, the passivation film includes an organic film. The organic film is formed by a spin-coating process. The organic film includes BCB or photo-acrylate. Also, the organic film is formed of a material in which a refractive index difference with the glass substrate is within about 10%.

In one embodiment of the present invention, the passivation film is formed on the glass substrate. Therefore, it is possible to prevent the glass substrate from being formed at an uneven thickness, which is generated by a scratch of the glass substrate when the glass substrate is unevenly etched.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, examples of which are illustrated in the accompanying drawings.

Figure 1:
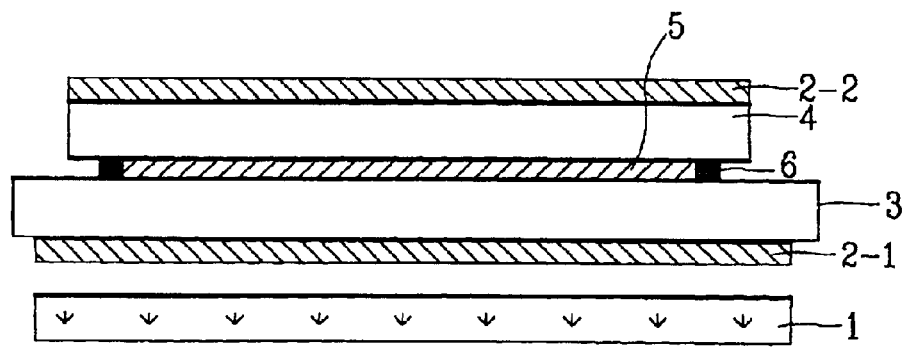
FIG. 1 is a sectional view of a general LCD device.
Figure 2A:
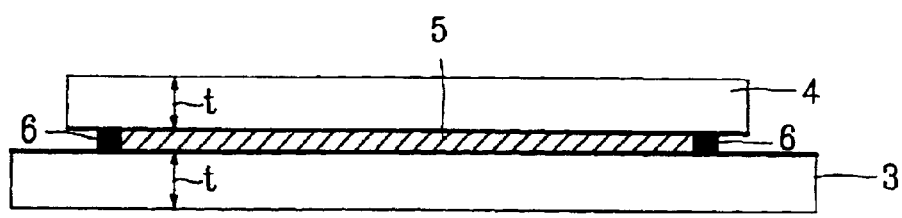
FIG. 2A and FIG. 2B are sectional views of an LCD panel before and after etching according to a related art.
Figure 2B:
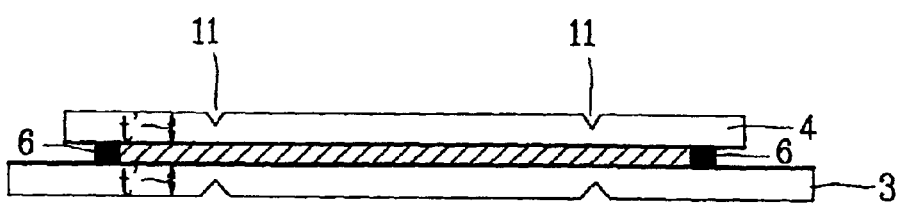
Figure 3A:
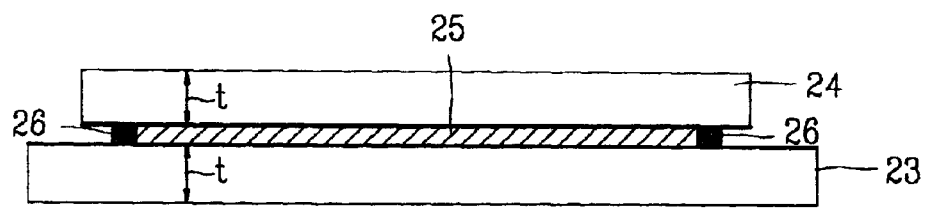
FIG. 3A to FIG. 3C are sectional views illustrating manufacturing process steps of a display panel according to the present invention.

An LCD device and a method for manufacturing the same will be described with reference to FIG. 3A to FIG. 3C. First, as shown in FIG. 3A, a plurality of gate lines and data lines (not shown) are formed on a first glass substrate 23 at a thickness of "t" to define pixel regions of a matrix arrangement (not shown). Also, the gate lines are formed to cross the data lines. Then, a thin film transistor and a pixel electrode are formed in the respective pixel regions (not shown).

A black matrix layer (light-shielding layer), a color filter layer and a common electrode are formed on a second glass substrate 24 at a thickness of "t" (not shown).

Such first and second glass substrates are assembled together by a sealing pattern 26 to form some space between the substrates. As shown in FIG. 3A, a liquid crystal 25 is injected into the space between the first glass substrate 23 and second glass substrate 24.

Figure 3B:
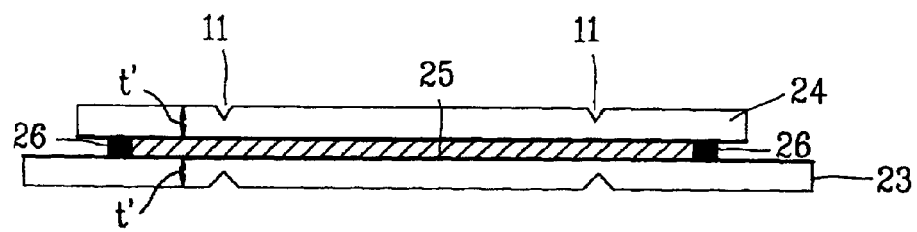

As shown in FIG. 3B, surfaces of the first and second glass substrates are thinned to a specific thickness (t') by chemical etching and/or mechanical polishing processes to thin the thickness of the first glass substrate 23 and second glass substrate 24 where the liquid crystal 25 will be injected.

The chemical etching process includes dipping the glass substrate into an etchant such as HydroFlouric acid (HF) solution, and then etching the glass substrate by exothermic reaction between the glass substrate and the etchant. In this method, a mechanical force is not applied to the glass substrate, so that the glass substrate is not damaged.

The mechanical polishing process includes polishing the assembled substrates with sandpaper or polisher while spraying coolant on the assembled substrates.

As shown in FIG. 3B, if the first and second glass substrates are etched by the chemical etching and/or the mechanical polishing processes, grooves 11 are formed in the surface of the substrate or scratches occur on the surface of the substrate due to unevenness of the etching process.

Figure 3C:
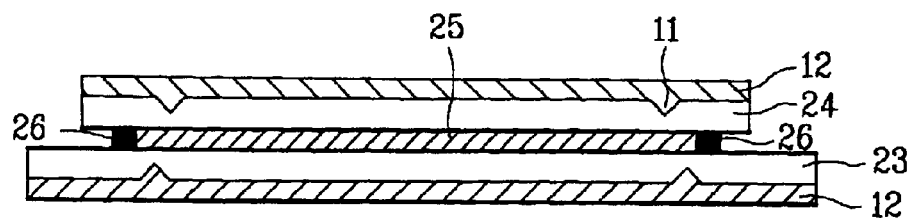

Accordingly, as shown in FIG. 3C, the passivation film 12 is thinly formed on the surfaces of the first substrate 23 and second glass substrate 24.

The passivation film 12 is formed of an organic film in which a refractive index difference of the glass substrates is within about 10%. The organic film is formed by a spin coating process. The organic film can include BenzoCycloButene (BCB) or photoacrylate.

In this method, if both of the top and bottom substrates are formed of glass, the top and bottom substrates are thin. Also, even if one of the top and bottom substrates is formed of glass, the top and bottom substrates are thin.

The chemical etching process is performed in an etching apparatus provided with etching, cleaning and drying portions. In the chemical etching process, the substrates are etched by the etchant filled in an etching bath of the etching portion, and then the etchant remaining on a surface of the substrate is removed in the cleaning portion. Subsequently, the substrate is dried in the drying portion, so that the substrate is completed.

In finishing the etching process of the substrate, the fine scratches of the substrate are polished. Then, a plurality of liquid crystal cells, which are formed in one substrate, are divided into single cells by a cutting process. After cutting the substrate, the liquid crystal 25 is injected into the substrate through a liquid crystal injection hole and the cut substrates are sealed by the sealing pattern 26. Therefore, the process steps are completed.

The substrates may be assembled together by another method, and then the liquid crystal is injected therebetween. Subsequently, the etching process and its later process steps are performed. The glass substrates 23 and 24 planarized by forming such a passivation film 12 are applicable to not only the LCD device but also the display panel.

Figure 4:
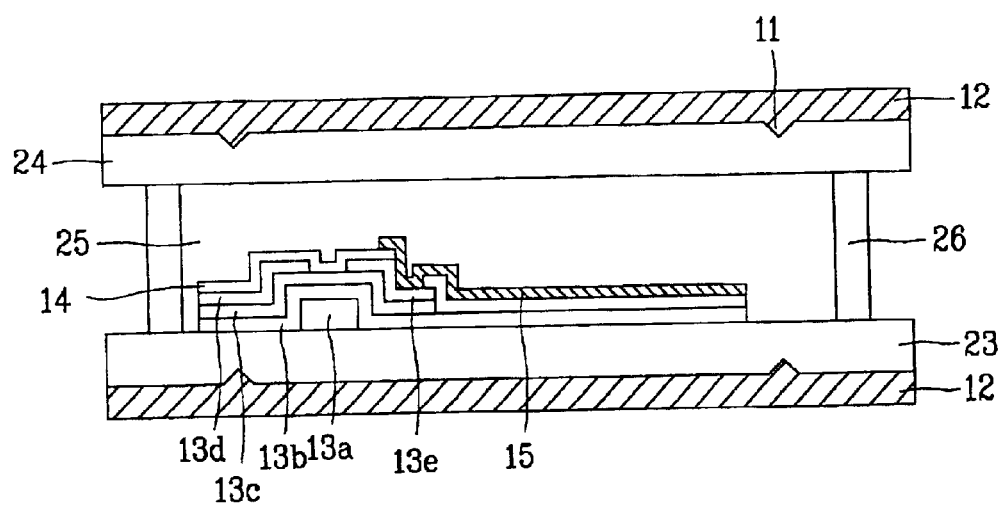
FIG. 4 is a sectional view of the display panel according to the present invention.

FIG. 4 is a sectional view of an LCD panel according to the present invention.

The LCD device according to the present invention has the following structure.

As shown in FIG. 4, the LCD device includes the first glass substrate 23, the second glass substrate 24, the liquid crystal 25, and the passivation film 12. In the first glass substrate 23, a plurality of gate lines and data lines are formed to define the pixel regions of a matrix arrangement (not shown). Also, the gate lines are formed to cross the data lines. Then, a plurality of thin film transistors and pixel electrodes are formed in the respective pixel regions (shown only as a unit for convenience) on the first glass substrate. The light-shielding layer, the color filter layer and the common electrode are formed in the second glass substrate 24 (not shown). The first and second glass substrates are assembled together with some spaces therebetween by the sealing pattern, and then the liquid crystal 25 is injected between the glass substrates. The passivation film 12 is coated on the surface of the assembled first and second glass substrates.

In FIG. 4, a gate electrode 13a connected with the gate line (not shown) is formed on the first glass substrate 23, and a gate insulating film 13b is formed on the surface of the first substrate including the gate electrode 13a. Also, an island shaped semiconductor layer 13c is formed on the gate insulating film 13b at an upper portion of the gate electrode 13a. A source electrode 13d and a drain electrode 13e are formed at respective sides of the semiconductor layer 13c to form a thin film transistor. A pixel electrode 15 is formed in one portion of the thin film transistor to connect with the drain electrode 13e.

A sealing pattern 26 may also be formed to prevent the etchant from being permeated into the substrates.

A polarizer (not shown) is attached outside the passivation film 12, and a backlight (not shown) that serves as a light source is formed in a lower portion of the first glass substrate 23.

As has been explained, the LCD device and the method for manufacturing the same according to the present invention have the following advantages.

In the LCD panel of the present invention, since a stable and inexpensive glass substrate is used, production yield is improved.

Also, since the passivation film such as BCB and photoacrylate is deposited on the glass substrate damaged by the etching process, the glass substrate is protected and flattened, thereby improving picture quality of the LCD panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device comprising:
   first and second substrates assembled together with some space therebetween, at least one substrate having an etched and uneven outer surface; and
   passivation layers on the etched and uneven outer surfaces of the first and second substrates,
   wherein the passivation layers are formed of a material having a refractive index within about 10% difference of the refractive index of at least one of the first and second substrates, and
   wherein the passivation layers include BenzoCycloButene (BCB).

2. The LCD device as claimed in claim 1, wherein at least one of the first and second substrates includes glass.

3. An LCD device comprising:
   first and second etched substrates having uneven outer surfaces;
   a liquid crystal layer between the first and second etched substrates; and
   passivation layers on the uneven outer surfaces of the first and second etched substrates,
   wherein the passivation layers are fanned of a material having a refractive index within about 10% difference of the refractive index of at least one of the first and second etched substrates, and
   wherein the passivation layers include BenzoCycloButene (BCB).

4. The LCD device as claimed in claim 3, wherein at least one of the first and second etched substrates includes glass.

5. A method for manufacturing an LCD device, comprising:
   preparing first and second substrates;
   assembling the first and second substrates;
   etching a surface of at least one of the first and second substrates to form a thin substrate with an uneven surface; and
   forming passivation layers on the entire uneven outer surface of the first and second substrates,
   wherein the passivation layers are formed of a material having a refractive index difference within about 10% of the refractive index of at least one of the first and second substrates, and
   wherein the passivation layers include BenzoCycloButene (BCB).

6. The method as claimed in claim 5, wherein at least one of the first and second substrates includes glass.

7. The method as claimed in claim 5, wherein the passivation layers are formed by a spin coating process.

8. The method as claimed in claim 5, further comprising injecting a liquid crystal between the first and second substrates, after forming the passivation layers on the outer surface of the first and second substrates.

9. The method as claimed in claim 5, further comprising injecting a liquid crystal between the first and second substrates, after assembling the first and second substrates with each other.

10. The method as claimed in claim 5, further comprising polishing the surface of the first and second substrates after etching a surface of at least one of the first and second substrates.

11. The method as claimed in claim 10, wherein polishing includes mechanically polishing the assembled substrates while spraying coolant on the assembled substrates.

12. The method as claimed in claim 11, wherein mechanically polishing includes polishing with sandpaper.

13. The method as claimed in claim 11, wherein mechanically polishing includes polishing with a polisher.

14. The method as claimed in claim 5, wherein the etching includes dipping the substrate into an etchant.

15. The method as claimed in claim 14, wherein the etchant is an HF solution.

16. The method as claimed in claim 14, wherein the etching includes etching the substrate by exothermic reaction between the substrate and the etchant.

17. The method as claimed in claim 5, wherein assembling the first and second substrates with each other includes a sealing pattern.

18. A liquid crystal display (LCD) device, comprising:

first and second substrates having uneven outer surfaces;

a liquid crystal layer between the first and second substrates; and passivation layers on the uneven outer surfaces of the first and second substrates, wherein the passivation layers are formed of a material in which a refractive index difference of the first and second glass substrates is within about 10%, and wherein the passivation layers include BenzoCycloButene (BCB).

19. The liquid crystal display as claimed in claim 18, wherein the substrates include glass.

20. The liquid crystal display as claimed in claim 18, further comprising a gate electrode and source and drain electrodes on the first substrate.

21. The liquid crystal display as claimed in claim 19, further comprising a sealing pattern formed between the first and second substrates.

* * * * *